United States Patent [19]
Ueki et al.

[11] Patent Number: 5,428,618
[45] Date of Patent: Jun. 27, 1995

[54] DEBUGGER APPARATUS AND METHOD HAVING AN EVENT HISTORY RECORDING CAPABILITY

[75] Inventors: Katsuhiko Ueki, Tokyo; Takeshi Yasuda, Yokohama, both of Japan

[73] Assignee: Kabushiki Kaisha Toshiba, Kawasaki, Japan

[21] Appl. No.: 186,855

[22] Filed: Jan. 27, 1994

[30] Foreign Application Priority Data

Jan. 27, 1993 [JP] Japan .................. 5-011804

[51] Int. Cl.$^6$ ............................. G01F 11/34
[52] U.S. Cl. .................... 371/19; 395/575; 364/DIG. 1; 364/DIG. 2; 364/267; 364/267.1; 364/267.2; 364/267.3; 364/267.4; 364/267.5; 364/267.6; 364/267.7; 364/267.91
[58] Field of Search ............... 364/DIG. 1, DIG. 2; 371/4, 15.1, 16.1, 16.2, 16.5, 17, 18, 19, 21.1, 21.6; 395/375, 500, 575, 800

[56] References Cited

U.S. PATENT DOCUMENTS 5,333,302  7/1994  Hensley et al. .............. 395/575

FOREIGN PATENT DOCUMENTS 3-158937  7/1991  Japan .

OTHER PUBLICATIONS

Tsai et al., "A Noninterference Monitoring and Replay Mechanism for Real-Time Software Testing and Debugging", *IEEE Transactions on Software Engineering*, Aug. 1990.

*Primary Examiner*—Robert B. Harrell
*Attorney, Agent, or Firm*—Banner, Birch, McKie & Beckett

[57] ABSTRACT

According to this invention, a debugger for supporting a debug operation for a program used in a computer having a memory and a register includes a user interface section for inputting a command from a user, an event history recording section for recording an event history of events occurring when the program undergoing debug is executed, a program behavior reproducing section for controlling the program in accordance with the event history to reexecute a portion of the program, an instruction execution history recording section for recording an instruction execution history including all instructions which are executed when the execution corresponding to the program are reproduced by the program behavior reproducing section, contents of the memory and register before the instructions are executed, and an instruction execution history reproducing section for selectively performing a back track for recovering an internal state of the computer to a state, obtained prior to execution of at least one instruction of the program, in accordance with the instruction execution history, and a reexecution, performed after the reverse execution is performed, on the basis of a command from the user interface section.

13 Claims, 7 Drawing Sheets

FIG. 1

| NUMBER | TASK NAME | EVENT CONTENT |
|---|---|---|
| 1 | TASK C | ADDRESS 2020 READ GV 1 |
| 2 | TASK C | ADDRESS 2050 READ GV 0   GV0=GV0-1 |
| 3 | TASK A | ADDRESS   10 WRITE GV 1 |
| 4 | TASK A | ADDRESS   30 WRITE GV 0 |
| 5 | TASK B | ADDRESS 1020 READ GV 1 |
| 6 | TASK B | ADDRESS 1020 READ GV 1 |
| 7 | TASK C | ADDRESS 2090 EXIT |
| 8 | TASK A | ADDRESS   40 WRITE GV 1 |
| 9 | TASK A | ADDRESS   50 EXIT |
| 10 | TASK B | ADDRESS 1020 READ GV 1 |
| 11 | TASK B | ADDRESS 1050 READ GV 0   GV0=GV0-1 |
| 12 | TASK B | ADDRESS 1050 READ GV 0   GV0=GV0-1 |
| 13 | TASK B | ADDRESS 1050 READ GV 0   GV0=GV0-1 |
| 14 | TASK B | ADDRESS 1050 READ GV 0   GV0=GV0-1 |
| 15 | TASK B | ADDRESS 1090 EXIT |

F I G. 2

| NUMBER | TASK NAME | CONTENTS OF REGISTER AND MEMORY TO BE CHANGED | ADDRESS | |
|---|---|---|---|---|
| 1 | TASK C | LVC1 ?? | IP 2010 | |
| 2 | TASK C | AX ?? | IP 2020 | |
| 3 | TASK C | F ?? | IP 2030 | |
| 4 | TASK C | | IP 2040 | |
| 5 | TASK C | AX=0 GV0=1 | IP 2050 | ~42 |
| 6 | TASK A | GV1 ?? | IP 10 | |
| 7 | TASK A | AX ?? | IP 20 | |
| 8 | TASK A | GV0=0 | IP 30 | |
| 9 | TASK B | LVB1 ?? | IP 1010 | |
| 10 | TASK B | AX ?? | IP 1020 | |
| 11 | TASK B | F ?? | IP 1030 | |
| 12 | TASK B | | IP 1040 | |
| 13 | TASK B | AX=1 | IP 1020 | |
| 14 | TASK C | LVC1=0 | IP 2060 | |
| 15 | TASK C | F(Z=1) | IP 2070 | |
| 16 | TASK C | | IP 2080 | |
| 17 | TASK C | EXIT | IP 2090 | |
| 18 | TASK A | GV1=1 | IP 40 | |
| 19 | TASK A | EXIT | IP 50 | |
| 20 | TASK B | F | IP 1030 | |
| 21 | TASK B | | IP 1040 | |
| 22 | TASK B | AX=1 GV0=4 | IP 1050 | |
| 23 | TASK B | AX=0 | IP 1060 | |
| 24 | TASK B | F | IP 1070 | |

FIG. 3

```
TASK A
;ADDRESS    LABEL      INSTRUCTION        COMMENT
                       CODE
   10                  MOV GV1,1          ; GV1←1              *EVENT*
   20                  MOV AX,4           ; AX←4
   30                  CALL SYS0          ; GV0←AX             *EVENT*
   40                  MOV GV1,0          ; GV1←0              *EVENT*
   50                  EXIT               ;                    *EVENT*

TASK B
;ADDRESS    LABEL      INSTRUCTION        COMMENT
                       CODE
  1010                 MOV LVB1,0         ; LVB1←0
  1020    LOOP B1:     MOV AX,GV1         ; AX←GV1             *EVENT*
  1030                 CMP AX,0           ; AX=0 ?
  1040                 JNZ LOOP B1        ; ELSE GOTO LOOP B1
  1050    LOOP B2:     CALL SYS1          ; AX←GV0 GV0←GV0-1   *EVENT*
  1060                 ADD LVB1,AX        ; LVB1←AX
  1070                 CMP AX,1           ; AX>1 ?
  1080                 JAZ LOOP B2        ; THAN GOTO LOOP B2
  1090                 EXIT               ;                    *EVENT*
  1100    LVB1         DW 0

TASK C
;ADDRESS    LABEL      INSTRUCTION        COMMENT
                       CODE
  2010                 MOV LVC1,0         ; LVC1←0
  2020    LOOP C1:     MOV AX,GV1         ; AX←GV1             *EVENT*
  2030                 CMP AX,0           ; AX=0 ?
  2040                 JNZ LOOP C1        ; ELSE GOTO LOOP C1
  2050    LOOP C2:     CALL SYS1          ' AX←GV0 GV0←GV0-1   *EVENT*
  2060                 ADD LVC1,AX        ; LVC1←AX
  2070                 CMP AX,1           ; AX>1 ?
  2080                 JAZ LOOP C2        ; THAN GOTO LOOP C2
  2090                 EXIT               ;                    *EVENT*
  2100    LVC1         DW 0

GLOBAL VARIABLES
  3010    GV0          DW 1
  3020    GV1          DW 0

SYS0
  4010                 MOV GV0,AX         ; GV0←AX
  4020                 RET

SYS1
  5010                 MOV AX,GV0         ; AX←GV0
  5020                 DEC,GV0            ; GV0←GV0-1
  5030                 RET
```

DEBUGGER APPARATUS AND METHOD HAVING AN EVENT HISTORY RECORDING CAPABILITY

BACKGROUND OF THE INVENTION

1. Field of the Invention

The present invention relates to a debugger and a method of supporting a debug, for supporting a debug operation for a program used in a computer.

2. Description of the Related Art

Verification of a program used in a computer is performed by a static test, a dynamic test, or the like to determine whether the program satisfies required conditions. When a bug (incorrect behavior) in the program is detected by the above test, manual correction (i.e., debug) is performed by a programmer.

When an error is detected in the test, a code for error must be specified. There are some methods of specifying a bug portion. Of these methods, a method of back tracking of the program behavior is an effective method. In order to realize this method, a detailed instruction execution history obtained during execution of the program is required. For this reason, according to a conventional technique, in order to perform the back track of the program, a complete instruction execution history is sampled/recorded during execution of a debugging program.

However, when a debugging program is a program such as a concurrent or real-time program having nondeterministic characteristics, the overhead of a recording execution is increased upon completely sampling/recording an instruction execution history. For this reason, the behavior of the program performed when the instruction execution history is sampled/recorded is largely different from that performed when the instruction execution history is not sampled/recorded, and the bug portion detected during a test may not be reproduced.

In order to solve this drawback, at present, the following method is considered. The behavior of a program is recorded during execution of the debugging program, and the program is analyzed along the behavior of the recorded program, thereby forming an instruction execution history. However, according to this method, a long time is required for analyzing the program.

Therefore, in a debugging program, such as a concurrent or real-time program having nondeterministic characteristics, a detailed instruction execution history cannot be easily recorded or analyzed.

SUMMARY OF THE INVENTION

It is an object of the present invention to provide a debugger and a method of supporting a debug, wherein an instruction execution history required for reexecuting a program can be sampled/recorded without adversely affecting an execution of the program, and the back track and reexecution of the target program can be performed on thee basis of the recorded instruction execution history. More specifically, it is the object of the present invention to provide a debugger and a method of supporting a debug, wherein even when a debugging program such as a concurrent or real-time program having no reproducibility is used, an instruction execution history required for performing the back track of the program can be sampled/recorded without adversely affecting an execution of the program, the back track and reexecution of the debugging program can be freely performed on the basis of the recorded instruction execution history, and defective behavior detected during a test can be reproduced.

A debugger according to the present invention is characterized by: a user interface section for inputting an instruction from a user; an event history recording section for recording an event history of events occurring when a debugging program is executed; a program behavior reproducing section for controlling the debugging program in accordance with the event history to reexecute an execution corresponding to the debugging program; an instruction execution history recording section for recording an instruction execution history including all instructions executed when the execution corresponding to the debugging program and reproduced by the program execution reproducing means and contents of the memory and register before the instructions are executed; and an instruction execution history reproducing section for selectively performing a back track for recovering an internal state of the computer to a state, obtained prior to execution of at least one instruction of the debugging program, in accordance with the instruction execution history, and a reexecution, performed after the back track is performed, on the basis of an instruction from of the user interface section.

The preferable aspects of the present invention are as follows.

(a) The computer executes any one of a concurrent program and a program executed in real time as the debugging program.

(b) The event history recording section includes means for recording an access instruction for the memory as the event.

(c) The event history recording section has a table which records occurrence numbers sequentially added to the events each time each event has occurred, tasks of the debugging program, and contents of the events.

(d) The event history recording section includes means for recording addresses of the debugging program and instructions to be executed.

(e) When the recording area for the event history or the instruction execution history is not sufficient, the apparatus may further comprise storage means for storing at least one of the event history and the instruction execution history.

A debug supporting method according to the present invention is characterized by: a first step of recording an event history of events occurring when a debugging program is executed; a second step of controlling the debugging program in accordance with the event history to reexecute an execution corresponding to the debugging program; a third step of recording an instruction execution history including all instructions executed when the execution corresponding to the debugging program is reproduced and contents of the memory and register before the instructions are executed; and a fourth step of selectively performing a back track for recovering an internal state of the computer to a state, obtained prior to execution of at least one instruction of the debugging program, in accordance with the instruction execution history, and a reexecution, performed after the back track is performed, on the basis of an instruction content of a user.

According to a debugger and a method of supporting a debug according to the present invention, an event history is sampled/recorded by the event history recording section during execution of a target program. The debugging program is controlled using this event history, and an execution is reproduced, thereby sampling/recording an instruction execution history. Therefore, in the debugger and the method of supporting a debug according to the present invention, since a method of sampling only the event history used for reproducing the execution is employed during execution of the debugging program, an influence on the behavior of the debugging program can be considerably smaller than that obtained by using a method of sampling all instruction execution histories during execution of the debugging program. Therefore, the instruction execution history can be sampled from the debugging program without causing the overhead of the recording operation of the instruction execution history to adversely affect the debugging program. In addition, according to the debugger of the present invention, a back track and a reexecution can be selectively performed using the instruction execution history each time an instruction of the debugging program is executed.

As described above, in the debugger and the method of supporting a debug according to the present invention, a debugging program is executed while an event history is sampled, and when incorrect behavior is detected, the execution of the target program for debug is controlled using the event history to reproduce the execution of the program. Therefore, the instruction execution history of the reproduced debugging program can be recorded while the influence of overhead caused by the recording operation is eliminated. The back track and reexecution of the debugging program can be performed using the recorded instruction execution history.

As described above, in the debugger and the method of supporting a debug according to the present invention, events can be easily sampled, and a incorrect behavior detected during a test can be easily reproduced without adversely affecting execution of a program.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

An embodiment will be described below with reference to the accompanying drawings.

Figure 1:
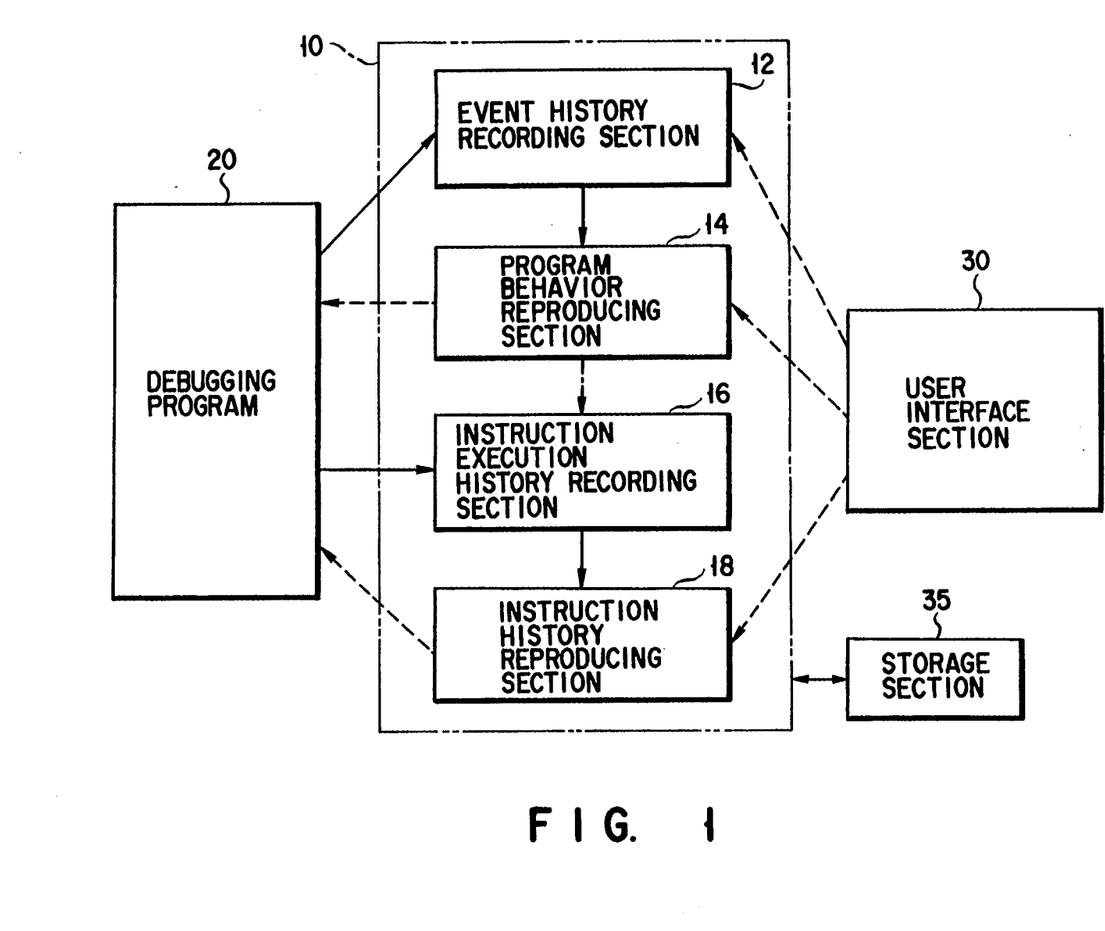
FIG. 1 is a block diagram showing the arrangement of a debugger according to an embodiment of the present invention.

FIG. 1 is a block diagram showing the arrangement of a debugger according to an embodiment of the present invention. FIG. 1 shows an example wherein a debugger 10 samples information for debug from a time sharing debugging program 20 (i.e., a program undergoing a debug operation). Referring to FIG. 1, a flow of data is indicated by arrows of solid lines, and a flow of control is indicated by arrows of dotted lines. In FIG. 1, a user interface section 30 comprises a display section and an input/output section (neither are shown), and performs communication between a user and the debugger 10. A storage section 35 stores an event history and an instruction execution history (to be described later) as needed.

The debugger 10 has an event history recording section 12, a program behavior reproducing section 14, an instruction execution history recording section 16, and an instruction execution history reproducing section 18.

Figure 2:
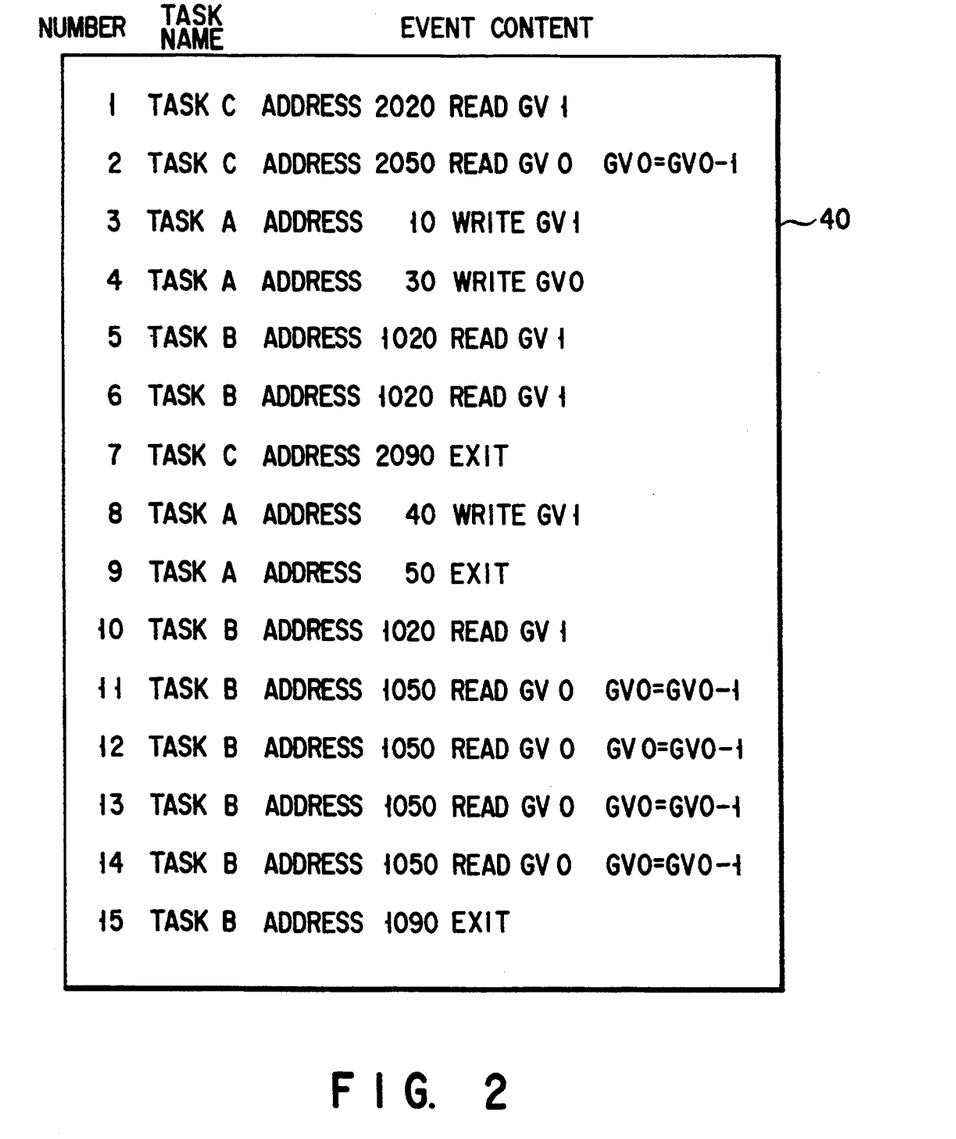
FIG. 2 view showing an event history recording table in an event history recording section in FIG. 1.

The event history recording section 12 sequentially records events in an event history recording table 40 shown in FIG. 2. In this case, the events represent instructions such as an access instruction for the memory in FIG. 2 and an input/output instruction between the event history recording section 12 and an external apparatus, for switching a program, e.g., inputting an external signal. In FIG. 1, although the event history recording section 12 is arranged to be called by the debugging program 20 when an event occurs in execution of the debugging program 20, the event history recording section 12 may always be set in an active state.

The event history recording section 12 records, as shown in FIG. 2, event numbers, the names of tasks in which events have occurred, the contents of the events (event occurrence addresses and detailed contents) in the event history recording table 40. In this embodiment, executions such as "access to global variable" and "completion of task execution" which influence executions between tasks are recorded as events.

The program behavior reproducing section 14 reproduces an execution of the debugging program 20 in accordance with an instruction from the user interface section 30 using an event history recorded in the event history recording table 40 of the event history recording section 12. While the debugging program 20 is reproduced by the program behavior reproducing section 14, the instruction execution history recording section 16 records an instruction execution history in an instruction execution history recording table 42 shown in FIG. 3 under the control of the program behavior reproducing section 14. In the instruction execution history recording section 16, the instruction numbers of executed instructions, task names, the contents of a register or a memory prior to changes in contents, and address pointers obtained prior to changes in address pointers are recorded in the instruction execution history recording table 42.

The instruction execution history reproducing section 18 recovers the state of the debugging program 20 to a state obtained before an instruction is executed, in accordance with an instruction from the user interface section 30 using the instruction execution history recorded in the instruction execution history recording table 42.

Figure 4:
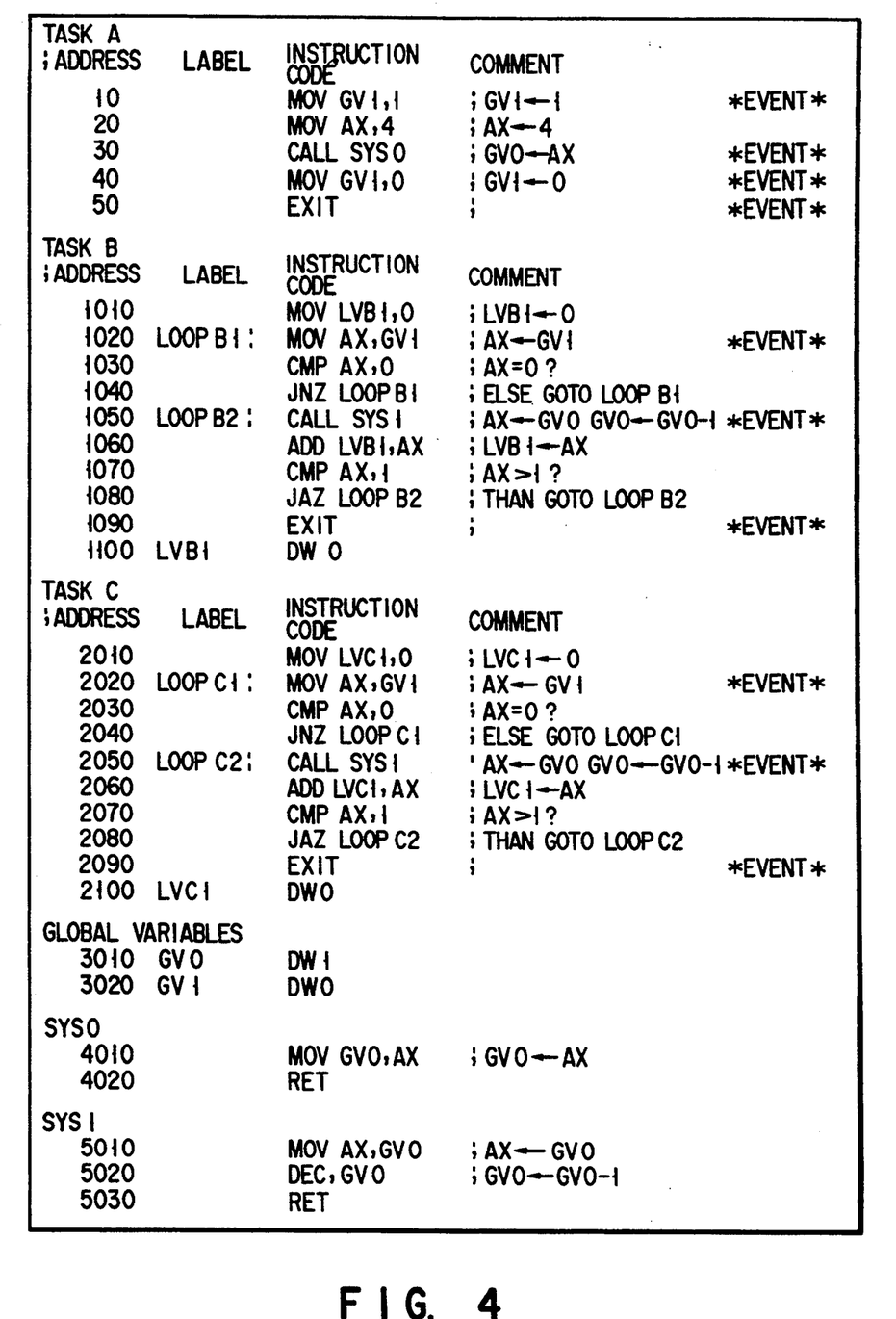
FIG. 4 is a view showing a debugging program.

An example of the target debugging program 20 is shown in FIG. 4.

Task A is an initialization program and initializes global variables GV0 and GV1. Task B and Task C are tasks having the same contents, and concurrently perform an operation of exclusively reading the value of the global variable GV0 using a system call SYS1 and an operation of adding this value to a local variable LVB1 (LVC1). The system call SYS1 is a system call for atomically performing two operations of returning the value of the global variable GV0 to an AX register and of subtracting 1 from the value of the global variable GV0 (without dispatching). Therefore, the value of the variable GV0 returned by the system call SYS1 is decremented by one each time the two operations are performed.

The global variable GV0 is a variable for managing a value to be added to the local variables of the two tasks (Task B and Task C) which are concurrently operated and represent a value to be added when the system call SYS1 is called next. The global variable GV1 is a flag representing the completion of initialization of the global variable GV0. In the global variable GV1, 0 represents that initialization is completed, 1 represents that initialization is being performed, and "*event*" represents that the instruction of a line having "*event*" is an event to be recorded in the event history recording table 40.

In the debugging program 20, after Task A initializes the global variable, the value of the global variable GV0 is added to each of the local variables of Task B and Task C. The value of the global variable GV0 is decreased each time the system call SYS1 for adding the value to the local variable is called, and the value is finally set to be −1. When the value of the global variable GV0 read out by the system call SYS1 is 1 or less, the executions of the corresponding task (i.e., one of Task A and Task B which reads the GV0) is completed. As a result, the sum of the initial values, i.e., 4 to 0 of the global variable GV0 is calculated such that sums of two local variables (LVB1 and LVC1) are calculated, and the sum of the local variables LVB1 and LVC1 becomes 10.

The above debugging program 20 has the following disadvantage. Task B or Task C is operated before the global variable GV0 is initialized, and Task B or Task C is abnormally operated when the global variable GV1 is set to be 0.

Figure 5:
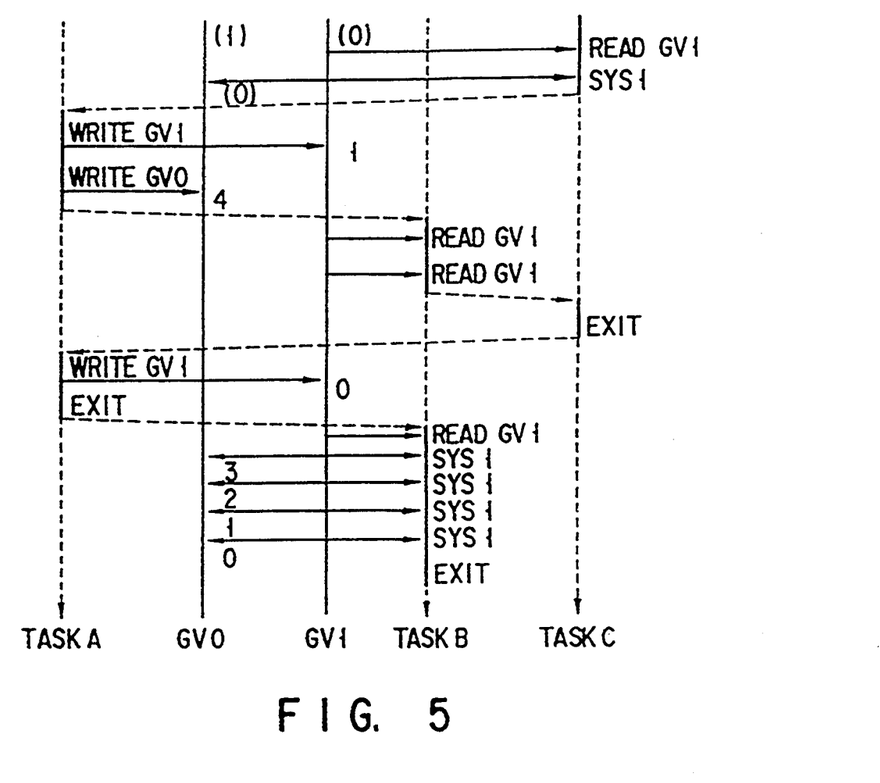
FIG. 5 is a view showing the flow of the debugging program.
Figure 6:
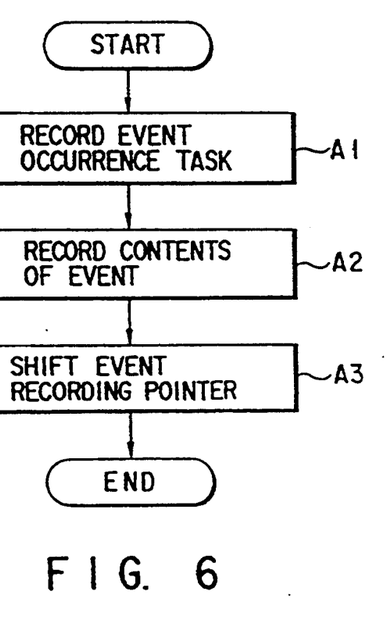
FIG. 6 is a flow chart showing an execution of the event history recording section incorporated in the apparatus of the present invention.

A sequence for causing the debugger 10 to sample debug information from the debugging program 20 will be described below with reference to FIGS. 4, 5, and 6.

Assume that the global variable GV0 is set to be 1, and the global variable GV1 is set to be 0 before initialization is performed in Task A. In this state, a case wherein the execution of the debugging program 20 is started, i.e., a case wherein Task C is started and the execution is started from address 2010 will be described below.

An event for reading the global variable GV1 serving as an initialization flag occurs at address 2020. An event occurrence task (Task C) and the contents of the event (in this case, the global variable GV1 is read at address 2020) are recorded in the event history recording table 40 (steps A1 and A2). An event recording pointer is moved to the next pointer (step A3), thereby completing the recording of an event history.

Figure 7:
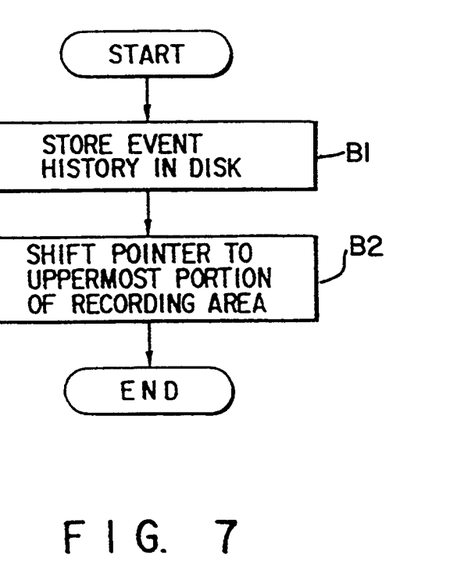
FIG. 7 is a flow chart showing processing in a case wherein the event recording area has no unused area.

In this case, in step A3, when an event recording area is full, the execution shown in FIG. 7 is performed.

All the contents of events recorded in the event recording area are stored in the storage section 35 (step B1). The pointer is moved to the uppermost portion (start position) of the event recording area (step B2).

With the above execution, even when the event recording area is full, all the contents of the events can be recorded.

when the global variable GV1 is examined (address 2030), the completion of initialization is determined (since GV1=1 is set before initialization is performed, erroneous determination is performed) (address 2040), and the value, i.e., 1 of the variable GV0 is added to a local variable at address 2050. Since an event has occurred at address 2050, steps A1 to A3 are executed to record the contents of the events in the event history recording table 40 as in the case of address 2020.

At this time, assume that switching of tasks has occurred by scheduling of time slices such that Task C is switched to Task A. Although Task A starts initialization, when Task A is switched to Task B during the initialization (address 30), Task B reads the global variable GV1 serving as an initialization flag at address 1020. At this time, since the global variable GV1 is being initialized (GV1=1), a loop is repeated (address 1040).

When Task B is switched to Task C again, a received task (GV0=1) is determined (address 2080) as a final remaining task, and Task C is ended.

When Task C is switched to Task A, initialization of Task A is completed, and Task A is ended. When Task A is switched to Task B, Task B singly reproduces an execution (the value of the variable GV0 is read by the system call SYS1 so as to be added to the local variable). As a result, the value of LVB1 becomes 10, the value of LVC1 becomes 1, and the sum of these values does not become 10 but 11.

In the execution described above, the event history recording section 12 records the contents of each event in the event history recording table 40 each time an event occurs.

Figure 8:
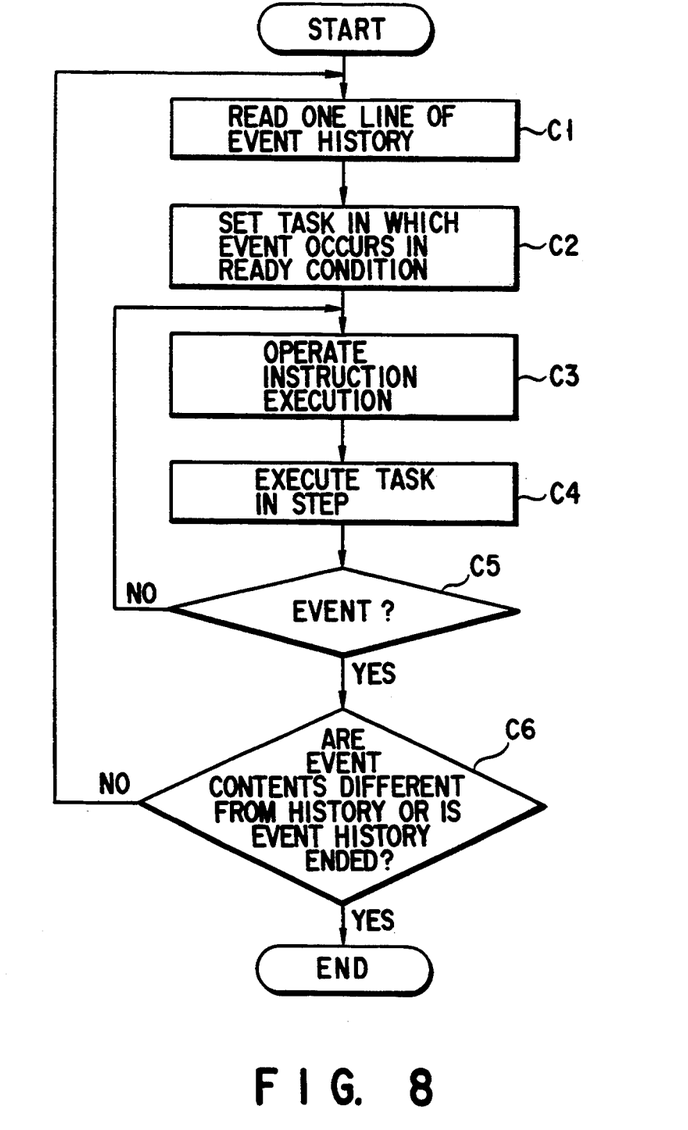
FIG. 8 is a flow chart showing an operation of a program behavior reproducing section incorporated in the apparatus of the present invention.
Figure 9:
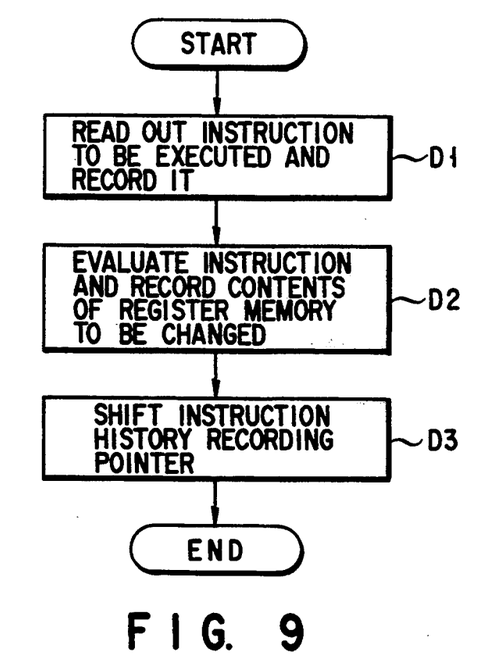
FIG. 9 is a flow chart showing an operation of the instruction execution history recording section.

By using the event history recorded in the event history recording table 40 as described above, a reexecution of the debugging program 20 performed by the instruction execution history recording section 16 and an operation of recording the instruction execution history shown in FIG. 3 performed by the instruction execution history recording section 16 will be described with reference to FIGS. 8 and 9.

When the program behavior reproducing section 14 reads out an event history corresponding to one line from the event history recording table 40 (step C1), since an event (number 1: read GV1 at address 2020 of Task C) is recorded in the event history recording table 40, the instruction execution history recording section 16 is operated, and Task C is executed from address 2010 (steps C2, C3, and C4).

The instruction execution history recording section 16 performs the following execution in every step of performing the reexecution of the program. The instruction execution history recording section 16 reads out an instruction to be executed, and records a task name, the original value (indefinite) of LVC1, and an instruction address in the instruction execution history recording table 42 to substitute LVC1 for 0 at, e.g., address 2010, (steps D1 and D2). In steps D1 and D2, the instruction execution history recording section 16 necessarily records a task name and an instruction address in the instruction execution history recording table 42 each time an instruction is executed. As in step A3 shown in FIG. 6, an instruction history recording pointer is moved to the next pointer (step D3), an instruction history corresponding to one step is ended. In step D3, if the instruction history recording area is full, instruction histories are sequentially recorded in the storage section 35, thereby sampling all the records.

When address 2020 of Task C is executed, since the value is substituted in the AX register, the original value (indefinite) is recorded in the instruction execution history recording table 42. This means that the event (number 1: read GV1 at address 2020 of Task C) recorded in the event history recording table 40 occurs (steps C5 and C6).

When the event recorded next is loaded from the event history recording table 40 (step C1), since this is an event (number 2: read GV0, GV0=GV0−1 at address 2050 of Task C), Task C is continuously executed (steps C2 to C4). Since the content of a flag register is changed at address 2030, the original value of the flag register is recorded.

As the result of the branch processing at address 2040, control is shifted to address 2050. Since the AX register and GV0 are changed at address 2050, the contents of the AX register and GV0 are recorded in the instruction execution history recording table 42. This means that the event (number 2: read GV0, GV0=GV0−1 at address 2050 of Task C) recorded in the event history recording table 40 has occurred (steps C5 and C6).

When the event recorded next is read from the event history recording table 40 (step C1), since this event is an event (number 3: write GV1 at address 10 of Task A) of Task A, a register or the like saved in advance is restored, and the task is switched to Task A. Task A is executed from address 10 (steps C2 to C4).

when the operations of steps C1 to C6 are reproduced, the instruction execution history recording table 42 can be obtained.

Figure 10:
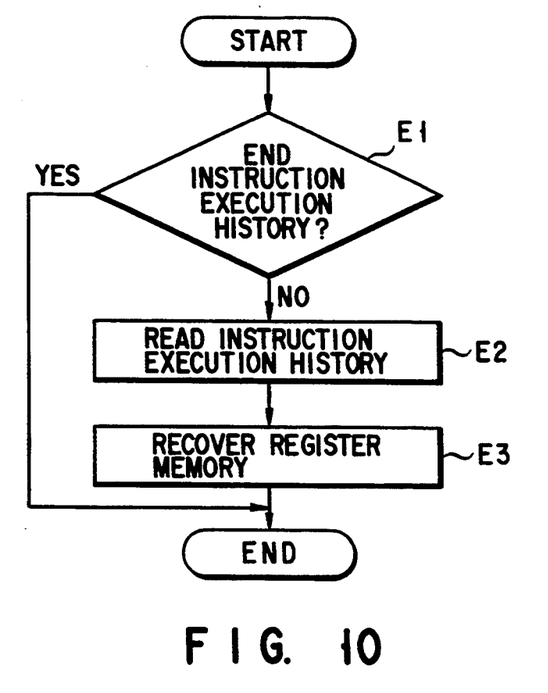
FIG. 10 is a flow chart showing an operation of the instruction execution history reproducing section incorporated in the apparatus of the present invention.

When the instruction execution history reproducing section 18 performs the operation shown in FIG. 10 using the instruction execution history recording table 42, the back track of a debugging program can be performed. The back track is a behavior of recovering the state of the program to the original state as if the instructions of the program are executed in the reverse direction.

It is checked whether an instruction execution history is present (step E1). If it is confirmed that the instruction execution history is present, the instruction execution history is read (step E2). A register memory is recovered to the state prior to execution of the instruction each time the instruction execution history is read out (step E3). In this manner, the back track of the debugging program can be performed. More specifically, an example wherein the back track of the 16th instruction to the 13th instruction in FIG. 3 is performed will be described below.

Figure 3:
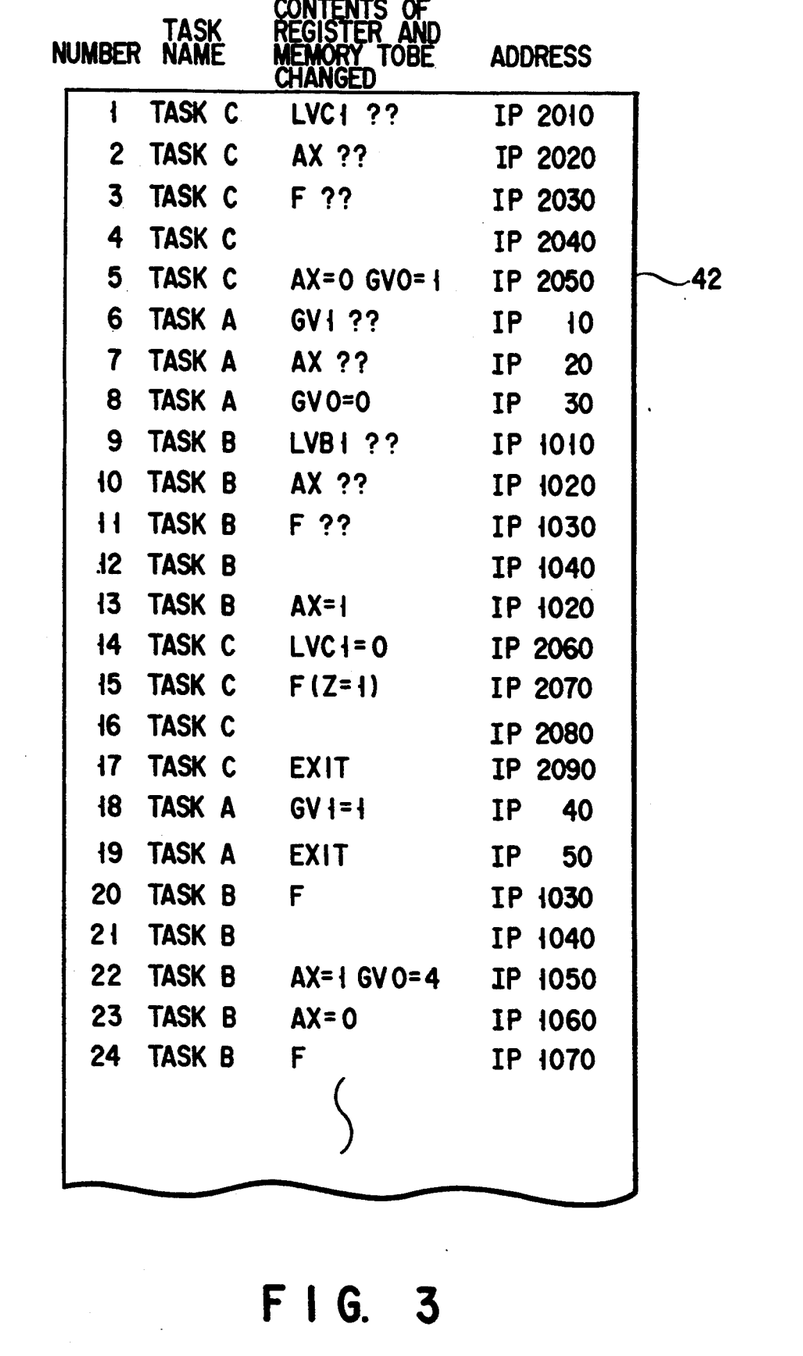
FIG. 3 is a view showing an instruction execution history recording table in an instruction execution history recording section incorporated in the apparatus of the present invention.

When an instruction at address 2080 of Task C is executed, the back track is started using a result obtained by executing the 16th instruction of the instruction execution history recording table 42 in FIG. 3.

In viewing the result obtained by executing the 16th instruction, there are no register and memory whose values are changed. For this reason, IP is set at address 2080. In addition, when the back track of the debugging program is performed using the result obtained by executing the 15th instruction, since it is recorded that the zero flag of the flag register is 1, the zero flag of the flag register is set to be 1, and IP is set at address 2070. The local variable LVC1 is set to be 0, IP is set at address 2060, and the back track of the next one step (14th instruction) is executed.

Since a result obtained by executing Task B is recorded as the result obtained by executing the 13th instruction, the register or the like of saved Task B is restored, the AX register is set to be 1, and IP is set at address 1020.

In order to perform the reexecution of the debugging program, the program may be executed again using the event execution history by the program behavior reproducing section 14 because the internal state of the program is completely recovered to an original state. The reexecution is defined as an execution in which, after the back track of the program is performed, in this state, the program is operated again in a normal direction.

As described above, all information required for a debug operation for the debugging program can be easily obtained. Therefore, according to the present invention, an instruction execution history required for performing the back track of the program can be sampled/recorded without adversely affecting the execution of the program. The back track and reexecution of the target program can be performed on the basis of the recorded instruction execution history.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. Apparatus for debugging a program used in a computer having a memory and a register, said program including a plurality of executable instructions each characterized as either a recordable or a non-recordable instruction, said apparatus comprising:

user interface means for accepting a command from a user;

event history recording means for recording from said program an event history of events occurring while said program is executed, each event corresponding to a recordable instruction, but not to a non-recordable instruction;

program behavior reproducing means for controlling the behavior of said program in accordance with said event history to reexecute a portion of said program;

instruction execution history recording means for recording an instruction execution history encompassing executable instructions which are executed when said portion of said program is reexecuted, said instruction execution history including, for each such instruction, contents of said memory and contents of said register before each such instruction is executed; and instruction execution history reproducing means for selectively performing a back track operation for recovering an internal state of said computer to a state, obtained prior to execution of at least one of said executable instructions, in accordance with said instruction execution history, and for selectively performing a second reexecution in accordance with said command accepted by said user interface means.

2. The apparatus according to claim 1, wherein said event history recording means comprises a table which records occurrence numbers sequentially added to each of said events each time each event has occurred, tasks of said program, and contents of each event.

3. The apparatus according to claim 2, wherein said event history recording means includes means for recording addresses of said program and instructions to be executed.

4. The apparatus according to claim 1, wherein said program comprises one of a concurrent program and a program executed in real time.

5. The apparatus according to claim 1, wherein said event history recording means includes means for recording as an event an access instruction for said memory.

6. The apparatus according to claim 1, further comprising storage means for storing at least one of said event history and said instruction execution history.

7. A method of debugging a program used in a computer having a memory and a register, said program including a plurality of executable instructions each characterized as either a recordable or a non-recordable instruction, said method comprising the steps of:

(a) recording from said program an event history of events occurring while said program is executed, each event corresponding to a recordable instruction but not to a non-recordable instruction;

(b) controlling the behavior of said program in accordance with said event history to reexecute a portion of said program;

(c) recording an instruction execution history encompassing executable instructions which are executed in step (b), said instruction execution history including, for each such instruction, contents of said memory and contents of said register before each such instruction is executed; and (d) selectively performing a back track operation for recovering an internal state of said computer to a state, obtained prior to execution of at least one of said executable instructions, in accordance with said instruction execution history, and for selectively performing a second reexecution in accordance with a command from a user.

8. Apparatus for debugging a computer program on a computer having a memory and a register, said computer program comprising a first plurality of executable instructions of a first category and a second plurality of executable instructions of a second category, said apparatus comprising:

means for recording a plurality of events during an execution of said computer program, each event corresponding to an instruction from said first category but not from said second category, such that only a subset of all executed instructions are recorded as events;

means, responsive to said recorded plurality of events, for controlling the behavior of said computer program to reexecute said first and second pluralities of executable instructions of said computer program in accordance with said recorded plurality of events;

means, responsive to said first and second pluralities of reexecuted instructions, for recording an execution history encompassing said first and second pluralities of reexecuted instructions of said computer program, said execution history comprising, for each said reexecuted instruction, contents of said memory and contents of said register before each said reexecuted instruction is reexecuted; and means for back tracking through said execution history and selectively performing a second reexecution of said first and second pluralities of executable instructions in accordance with a user-provided input.

9. The apparatus of claim 8, wherein said computer program comprises a plurality of tasks, and wherein said first category of executable instructions comprises executable instructions which influence task changes.

10. The apparatus of claim 9, wherein said first category of executable instructions comprises calls to an operating system.

11. The apparatus of claim 9, wherein each recorded event comprises information regarding a task name, an instruction pointer address, and an event number.

12. The apparatus of claim 8, wherein said first category of executable instructions comprises instructions which access global variables.

13. The apparatus of claim 12, wherein said second category of executable instructions comprises a compare instruction.

* * * * *